United States Patent [19]

Bradburn

[11] 4,104,544

[45] Aug. 1, 1978

[54] CURRENT LIMITING CIRCUIT FOR DIRECT CURRENT POWER SUPPLIES

[75] Inventor: Robert A. Bradburn, Pittsburgh, Pa.

[73] Assignee: The United States of America as represented by the Secretary of the Interior, Washington, D.C.

[21] Appl. No.: 778,271

[22] Filed: Mar. 16, 1977

[51] Int. Cl.² .............................................. H03K 1/02
[52] U.S. Cl. .................................... 307/297; 307/237
[58] Field of Search .................. 307/296 R, 297, 237, 307/313

[56] References Cited

U.S. PATENT DOCUMENTS

| 3,163,814 | 12/1964 | Todd | 307/296 X |
|---|---|---|---|
| 3,219,912 | 11/1965 | Harrison | 307/296 X |
| 3,723,774 | 3/1973 | Rogers | 307/296 |

*Primary Examiner*—John S. Heyman
*Attorney, Agent, or Firm*—Gersten Sadowsky; Donald A. Gardiner

[57] ABSTRACT

A current limiting circuit for direct current power supplies comprises first and second transistor switches connected in series between the power supply and a load which control the passage of current therebetween, third and fourth transistor switches which control the first and second switches, respectively, and first and second control circuits which control the third and fourth switches. The first control circuit comprises a fifth transistor switch which controls the third and fourth switches, a current sensing resistor connected in series between the power supply and the first and second switches, a first voltage dividing circuit connected across the power supply which produces a first reference voltage corresponding to a predetermined current limit, and a comparator which compares the voltage produced across the current sensing resistor with the first reference voltage and produces an output which controls the fifth switch such that the first and second switches are closed unless the current being drawn by the load exceeds the predetermined limit. The second control circuit comprises a sixth transistor switch which also controls the third and fourth switches, a second voltage dividing circuit connected across the power supply which produces a second reference voltage corresponding to a predetermined minimum load voltage, and a comparator which compares the voltage produced across the load with the second reference voltage and produces an output which controls the sixth switch such that the first and second switches are open when the voltage across the load is below the predetermined value therefor.

4 Claims, 1 Drawing Figure

CURRENT LIMITING CIRCUIT FOR DIRECT CURRENT POWER SUPPLIES

FIELD OF THE INVENTION

The present invention relates generally to current limiting circuits, and specifically to current-limiting circuits for direct current power supplies.

DESCRIPTION OF THE PRIOR ART

In many applications of electrical equipment, such as in coal mines, it is of critical importance from the standpoint of safety that the power supplies associated with such equipment have current limiting circuitry which prevents excessive current flow in situations where the electrical equipment is overloaded or short-circuited. Examples of prior art current limiting circuits are disclosed in U.S. Pat. Nos. 3,343,037 (Kutz); 3,445,751 (Easter); 3,736,469 (Baugher et al.); and 3,899,718 (Schafe). In these and other current limiting circuits utilizing transistor switches, proper circuit operation is dependent on the proper operation of a single current-limiting switch, which is controlled by a single control switch. Further, conventional current limiting circuits detect a current overload condition by sensing but a single current parameter, such as the voltage across a current sensing resistor (e.g., the Easter and Schafe devices), the voltage across the load (e.g., the Kutz device), or the voltage across the current limiting switch (e.g. the Baugher et al. device). Such circuits thus have the serious disadvantage of being responsive to only one type of curent overload condition, which may not provide adequate protection with certain types of overloads, and increases the possibility of burnout of the current limiting circuitry itself. Still further, in conventional current limiting circuits the control switch is in a conductive state when the current limiting switch is in a non-conductive state, creating a stand-by current drain which is undesirable where the power supply is of the battery type.

SUMMARY OF THE INVENTION

These and other disadvantages of the prior art are overcome by a current limiting circuit constructed according to the present invention, which comprises first and second transistor switches connected in series between a power supply and load for controlling the passage of current from the power supply to the load, third and fourth transistor switches for controlling the first and second switches, respectively, and first and second control means for controlling the third and fourth switches. The first control means comprises means responsive to the current being drawn by a load such that both the first and second switches are closed unless the current being drawn by the load exceeds a predetermined value therefor. The second control means comprises means responsive to the voltage across the load such that both the first and second switches are open when the voltage across the load is below a predetermined value therefor. Advantageously, the first control means comprises a fifth transistor switch for controlling the third and fourth switches, a current sensing resistor connected in series between the power supply and the first and second switches, a first voltage dividing circuit connected across the power supply for producing a first reference voltage corresponding to the predetermined current value, and a first comparator means for comparing the voltage produced across the current sensing resistor with the first reference voltage and for producing an output for control of the fifth switch. The second control means preferably comprises a sixth transistor switch for controlling the third and fourth switches, a second voltage dividing circuit connected across the power supply for producing a second reference voltage corresponding to the predetermined voltage value, and second comparator means for comparing the voltage produced across the load with the second reference voltage and for controlling the sixth switch. In accordance with a further aspect of the invention, the current limiting circuit further comprises means for connecting the fifth and sixth switches such that when the sixth switch is closed, the first and second switches are open and the fifth switch is electrically bypassed.

Other features and advantages of the invention will be set forth in, or apparent from, the detailed description of a preferred embodiment found hereinbelow.

DETAILED DESCRIPTION OF A PREFERRED EMBODIMENT

Figure 1:
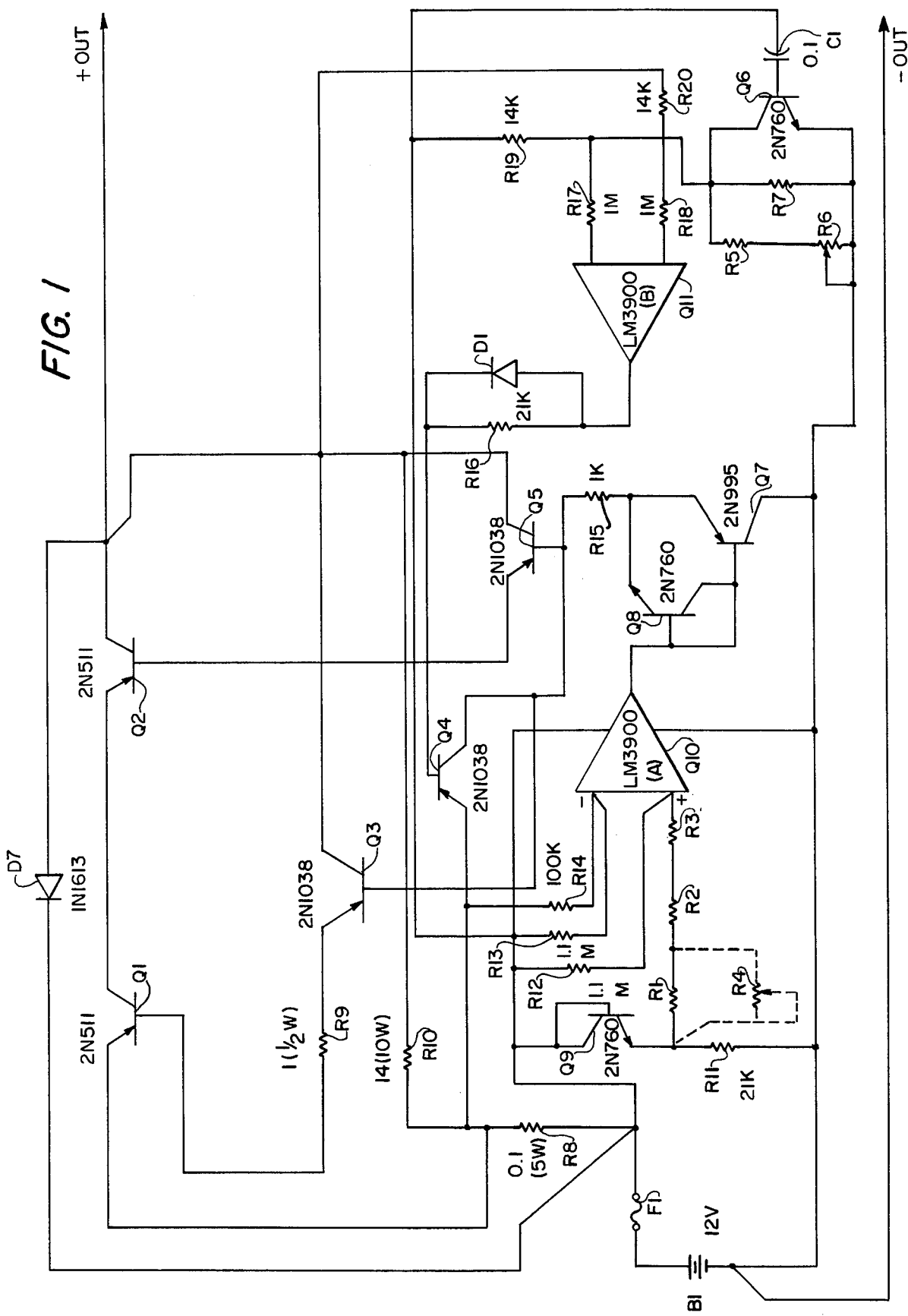
FIG. 1 is a schematic diagram of a direct current power supply incorporating a current limiting circuit constructed according to the present invention.

Referring to FIG. 1, a current limiting circuit constructed according to the present invention is illustrated as being connected through a circuit breaker or fuse F1 to a direct current power supply in the form of a battery B1. Before proceeding, it is noted that circuit component values which have proved satisfactory for a 12 volt battery B1 are indicated in FIG. 1. Except where otherwise indicated, all resistors may be power rated at one-eighth watt.

The current limiting circuit generally comprises a pair of transistor switches Q1 and Q2 connected in series between battery B1 and the output, to which a load (not shown) is connected, for controlling the passage of current from battery B1 to the output, a pair of transistor switches Q3 and Q5 for controlling the switches Q1 and Q2, respectively, a transistor switch Q7, and associated control circuitry, responsive to the current being drawn by the load, for controlling switches Q3 and Q5, and a transistor switch Q4, and associated control circuitry, responsive to the voltage across the load, for controlling switches Q3 and Q5.

Switches Q3 and Q5 are connected between the respective control electrodes or bases of switches Q1 and Q2 and the collector supply voltage for switch Q2, as shown, such that when switches Q3 and Q5 are closed, switches Q1 and Q2 are biased into a conductive state. Similarly, switch Q7 is connected between the bases of switches Q3 and Q5 and the common collector supply voltage therefor. Switch Q4 is connected between the bases of switches Q3 and Q5 and the emitter supply voltage therefor. A resistor R15 is connected in series with switch Q7 to prevent shorting battery B1 when both switches Q4 and Q7 are closed. As will be appreciated by those skilled in the art, if switch Q7 is open, then all of the switches Q3, Q5, Q1, and Q2 will also be open, and thus no current can pass from battery B1 to the output. If switch Q4 is open, then when switch Q7 is closed, switches Q3 and Q5 will be closed, which in turn will close switches Q1 and Q2, thus allowing current to pass from battery B1 to a load connected across the output. If switch Q4 is also closed, then switches Q3 and Q5, and thus switches Q1 and Q2, will be open, and switch Q7 will be electrically bypassed such that no current can pass from battery B1 to the output, even if switch Q7 is closed.

The circuitry for controlling switch Q7 comprises current sensing resistor R8 connected in series between the power supply and switches A1 and Q2, a voltage dividing circuit comprising transistor Q4, resistors R1, R2, R3, and R11, and, optionally, potentiometer R4, connected as shown across battery B1 for producing a reference voltage corresponding to a predetermined maximum current limit which is desired, and a conventional comparator Q10 and associated biasing resistors R12, R13, and R14, and transistor Q8 for producing an output signal which controls switch Q7. It will be noted that transistors Q8 and Q9 are connected as diodes as an alternative to regular silicone diodes. Q8, possibly superfluous, nonetheless does provide a more complete bias current cutoff of transistors Q3 and Q5. Comparator Q10 is connected as shown, such that one input senses the voltage drop across resistor R8, the other input senses the current limit reference voltage, and the output produces a voltage which is "low", or near zero potential, referenced to the negative side of battery B1, unless the voltage drop across resistor R8 exceeds the current limit reference voltage, in which case the output of comparator Q10 swings "high", referenced to the negative side of battery B1. With the output of comparator Q10 low, switch Q7 is closed, and with the output of comparator Q10 high, switch Q7 is open. The current limit reference voltage may be adjusted by varying the values of resistors R1, R2, R3, and R11, and potentiometer R4. The action of Q7 is to limit the load current to a prescribed value but not cut if off. The action of Q4 is to completely interrupt the current flow through transistors Q1 and Q2 by shunting the biasing currents of Q3 and Q5 when the ohmic value of the load resistance decreases a prescribed amount beyond that dictated by the current limit value. This provides a tripping action, which is nonresettable until the overload is removed from the output, and the maximum power dissipation of Q1 and Q2 under load fault conditions is held at a safe value.

The circuitry for controlling switch Q4 comprises a voltage dividing network comprising resistors R5, R7, and R19, and potentiometer R6 connected as shown for producing a reference voltage corresponding to a predetermined minimum voltage limit across the load which is desired, and a conventional comparator Q11 and associated biasing resistors R17, R18, and R20 for producing an output signal which controls switch Q4. Comparator Q11 is connected as shown, such that one input senses the voltage across a load connected to the output terminals, the outer input senses the voltage limit reference voltage, and the output produces a voltage which is "high", referenced to the negative side of battery B1, unless the voltage across the load drops below the voltage limit reference voltage, in which case the output voltage is "low", or near zero potential, referenced to the negative side of battery B1. The output of comparator Q11 is connected as shown to the base of switch Q4 through a diode D1 which is shunted by a resistor R16. Diode D1 may advantageously be silicon and have a peak-inverse-voltage rating of 30 volts. With the output of comparator Q11 high, switch Q4 is open, and with the output of comparator Q11 low, switch Q4 is closed. The voltage limit reference voltage may be varied to meet safety requirements by varying the values of resistors R5, R7, and R19, and potentiometer R6.

It might be mentioned here that transistor Q6 coupled to the 12v supply by capacitor C1, momentarily defeats the operation of comparator Q11 when the power source is first connected to the circuit to facilitate momentary heavy output loading conditions.

The current limiting circuit is also provided with diode D7, resistor R10, transistor Q6, and capacitor C1, connected as shown. Resistor R10 and transistor Q6 facilitate starting when a load is connected to the battery, since a residual current always flows in the load through resistor R10, regardless of the states of switches Q1 and Q2. Diode D7 facilitates charging of battery B1 from the output terminals.

As will be appreciated by those skilled in the art, switches Q1 and Q2 will be closed and current allowed to flow from battery B1 to a load only if switch Q7 is closed and switch Q4 is open. Both switches Q7 and Q4 act to open switches Q1 and Q2 if the current flowing to the load exceeds predetermined limits, but each acts independently of the other, with the control circuitry for switch Q7 being responsive to the current flow through a sensing resistor which is separate from the load, and with the control circuitry for switch Q4 being responsive to the actual voltage across the load, as described hereinabove. It should be noted that Q9 is used as a silicone reference diode to establish a reference voltage at the juncture of resistors R11 and R1. The current limiter of the present invention thus provides a redundancy which ensures that any one switch can become shorted or opened, and the circuit will still function to limit current flow to a safe value. A further advantage of the present invention is the high current capability with a relatively low voltage loss, and a low standby current drain which is particularly advantageous with small battery-type power supplies.

It will be appreciated by those skilled in the art that although the invention has been described relative to an exemplary embodiment thereof, modifications and variations can be effected in these embodiments without departing from the scope and spirit of the invention.

I claim:

1. A circuit for limiting the output from a constant voltage, single direct current power supply to a load, said circuit comprising:

first and second transistor switches connected in series between the power supply and load for controlling the passage of current from the power supply to the load;

third and fourth transistor switches for controlling said first and second switches, respectively; and first and second control means for controlling said third and fourth switches, said first control means including a first comparator means responsive to the current being drawn by the load and sensing the differential between the load current and the current limit reference from the power supply such that both said first and second switches are closed unless the current being drawn by the load exceeds a predetermined value therefor, and said second control means including a second comparator means responsive to the voltage across the load and sensing the differential between the load voltage and the reference voltage from the power supply such that both said first and second switches are open when the voltage across the load is below a predetermined value therefor, at least one of said control switches being in a nonconductive state when an output switch is in a nonconductive state to eliminate stand-by drain from the single power source.

2. The current limiting circuit of claim 1 wherein said first control means comprises a fifth transistor switch for controlling said third and fourth switches, a current sensing resistor connected in series between the power supply and said first and second switches, a first voltage dividing circuit connected across the power supply for producing a first reference voltage corresponding to said predetermined current value, and first comparator means for comparing the voltage produced across said current sensing resistor with said first reference voltage and for producing an output for control of said fifth switch.

3. A circuit for limiting the current from a direct current power supply to a load, said circuit comprising:
first and second transistor switches connected in series between the power supply and load for controlling the passage of current from the power supply to the load;
third and fourth transistor switches for controlling said first and second switches, respectively; and
first and second control means comprising means responsive to the current being drawn by the load such that both said first and second switches are closed unless the current being drawn by the load exceeds a predetermined value therefor, and said second control means comprising means responsive to the voltage across the load such that both said first and second switches are open when the voltage across the load is below a predetermined value therefor;
said first control means comprises a fifth transistor switch for controlling said third and fourth switches, a current sensing resistor connected in series between the power supply and said first and second switches, a first voltage dividing circuit connected across the power supply for producing a first reference voltage corresponding to said predetermined current value, and first comparator means for comparing the voltage produced across said current sensing resistor with said first reference voltage and for producing an output for control of said fifth switch;
second control means comprises a sixth transistor switch for controlling said third and fourth switches, a second voltage dividing circuit connected across the power supply for producing a second reference voltage corresponding to said predetermined voltage value, and second comparator means for comparing the voltage produced across the load with said second reference voltage and for controlling said sixth switch.

4. The current limiting circuit of claim 3 further comprising means for connecting said fifth and sixth switches such that when said sixth switch is closed, said first and second switches are open and said fifth switch is electrically bypassed.

* * * * *